(12) United States Patent
Dyess

(10) Patent No.: US 9,176,491 B2
(45) Date of Patent: Nov. 3, 2015

(54) REMOTE TERMINAL THERMOSTAT

(71) Applicant: GridPoint, Inc., Arlington, VA (US)

(72) Inventor: Daniel K. Dyess, Roanoke, VA (US)

(73) Assignee: GridPoint, Inc., Arlington, VA (US)

( * ) Notice: Subject to any disclaimer, the term of this patent is extended or adjusted under 35 U.S.C. 154(b) by 413 days.

(21) Appl. No.: 13/836,368

(22) Filed: Mar. 15, 2013

(65) Prior Publication Data

US 2014/0277748 A1   Sep. 18, 2014

(51) Int. Cl.
| | |
|---|---|
| G01M 1/38 | (2006.01) |
| G05B 13/00 | (2006.01) |
| G05B 15/00 | (2006.01) |
| G05D 23/00 | (2006.01) |
| G05D 9/00 | (2006.01) |
| G05D 7/00 | (2006.01) |
| G05D 11/00 | (2006.01) |
| G05D 11/02 | (2006.01) |
| G05D 11/16 | (2006.01) |
| G05D 3/12 | (2006.01) |
| G05D 5/00 | (2006.01) |
| G05B 15/02 | (2006.01) |
| F24F 11/00 | (2006.01) |

(52) U.S. Cl.
CPC ......... *G05B 15/02* (2013.01); *F24F 2011/0091* (2013.01); *G05B 2219/2614* (2013.01)

(58) Field of Classification Search
CPC ............ G05B 15/02; G05B 2219/2614; F24F 2011/0091
USPC .................................................. 700/275–286
See application file for complete search history.

(56) References Cited

U.S. PATENT DOCUMENTS

| | | | |
|---|---|---|---|
| 2006/0071089 A1* | 4/2006 | Kates .............................. | 236/94 |
| 2008/0015739 A1* | 1/2008 | Wacker ........................ | 700/276 |
| 2008/0179053 A1* | 7/2008 | Kates ............................. | 165/208 |
| 2009/0057428 A1* | 3/2009 | Geadelmann et al. .......... | 236/51 |
| 2011/0202185 A1* | 8/2011 | Imes et al. .................... | 700/277 |
| 2014/0316581 A1* | 10/2014 | Fadell et al. .................. | 700/276 |

* cited by examiner

*Primary Examiner* — Mohammad Ali
*Assistant Examiner* — Ziaul Karim
(74) *Attorney, Agent, or Firm* — Greenberg Traurig, LLP

(57) ABSTRACT

An energy management system having a centralized site controller is provided with thermostats in multiple zones, each thermostat having the capability of acting as a remote terminal to the controller. Each thermostat provides an interface to the site controller while simultaneously acting as the thermostat for each zone. The thermostat can display information concerning the state of the building's lighting and HVAC systems for any zone and allow the local user to initiate local overrides of set points. In an embodiment, override requests are received by the central controller and merged with the settings for the current control algorithms.

18 Claims, 6 Drawing Sheets

REMOTE TERMINAL THERMOSTAT

BACKGROUND OF THE INVENTION

1. Field of the Invention

The invention relates generally to systems and methods of monitoring, controlling, and managing energy usage. More specifically, the invention relates to systems and methods for reviewing and overriding energy management system parameters using a remote terminal unit such as a thermostat.

2. Description of the Related Art

Energy management systems (EMS's) typically control and monitor multiple endpoints such as HVAC units, lighting panels, and/or other power consuming devices, typically located in different areas (zones) of a building. If endpoints are monitored and controlled by a centralized EMS, some local control is also desirable in order to provide local users a system status review and the ability to initiate temporary control overrides in a particular zone.

Local monitoring and control can be performed in several ways. In some systems, the site controller has a display that shows the status and other data associated with all of the energy management equipment. To make a change or to view status and data, an individual must be present at the location of the central site controller. However, it is often difficult to find a single location for the controller/display that allows convenient access by personnel from each zone. In the case of lighting control, many systems employ electromechanical switches and status indicators. To override a lighting group, a switch would be pressed or pushed and the state of the group would change. An indicator would reflect the changed status accordingly. Electromechanical solutions, however, lack the flexibility of a full digital solution. In some systems, particularly ones where the site controller lacks a display, users are provided with a web portal or other software residing at an onsite computer. However, many businesses do not allow all employees to use the computers, thus preventing some employees from initiating local overrides when necessary.

BRIEF SUMMARY OF THE INVENTION

What is needed is an onsite energy management system that offers a convenient, flexible, and inexpensive means of reviewing operational data and making override changes to any of the HVAC or lighting control devices from any zone. To that end, one or more thermostats are provided with terminal mode operation that gives users a means to control any HVAC unit and lighting controllers from any thermostat display. The thermostat includes a touch screen that provides an interface for requesting temporary override control of building lighting and HVAC set points, as well as reporting the state of the system. Change requests transmitted by the thermostats are merged with the system state at the central site controller, which determines whether to allow the override and to when to restore the HVAC or lighting controls to the normal set point schedule. This arrangement allows for a simple centralized building controller without the requirement of it having its own display, and further provides inexpensive, flexible, and convenient local override control.

Various embodiments of the invention solve the above-mentioned problems by providing an energy management system having a centralized site controller with thermostats in multiple zones, each thermostat having the capability of acting as a remote terminal to the controller. Each thermostat provides an interface to the site controller while simultaneously acting as the thermostat for each zone. The thermostat displays information concerning the state of the building's lighting and HVAC systems for any zone and allows the local user to initiate local overrides of set points. The central site controller determines how many thermostats are enabled with a terminal mode, including the full extent of their read and write permissions for other zones. The override requests are received by the central controller and merged with the settings for the current control algorithms. The central controller may be configured such that, after a predetermined amount of time has elapsed, the central controller reinstates the current control algorithm. The entire system can also be placed in an unoccupied state using a thermostat in remote terminal mode with appropriate permission from the centralized site controller. Further, system status changes are sent periodically to the remote thermostats for display and the remote thermostat terminals are polled periodically for change requests. As an alternative to polling, remote thermostats can be configured to send change request messages to the central controller at regular intervals or in real time as change requests are made. The thermostat can be activated in run time, and endowed with terminal mode while still performing as a thermostat.

In another embodiment, a remote terminal does not necessarily have to be a thermostat, but can be extended to a computer or other peripherals that have the capability to communicate with the building controller.

In a further embodiment, zones in external buildings may be controlled and monitored via the main site's controller using a single thermostat associated with the site controller.

In yet another embodiment, a single controller could provide control for multiple sites, each having a remote thermostat interface to the single controller.

BRIEF DESCRIPTION OF THE DRAWINGS

These and other features, aspects, and advantages of the present invention will become better understood with reference to the following description and appended claims, and accompanying drawings where:

Figure 1:
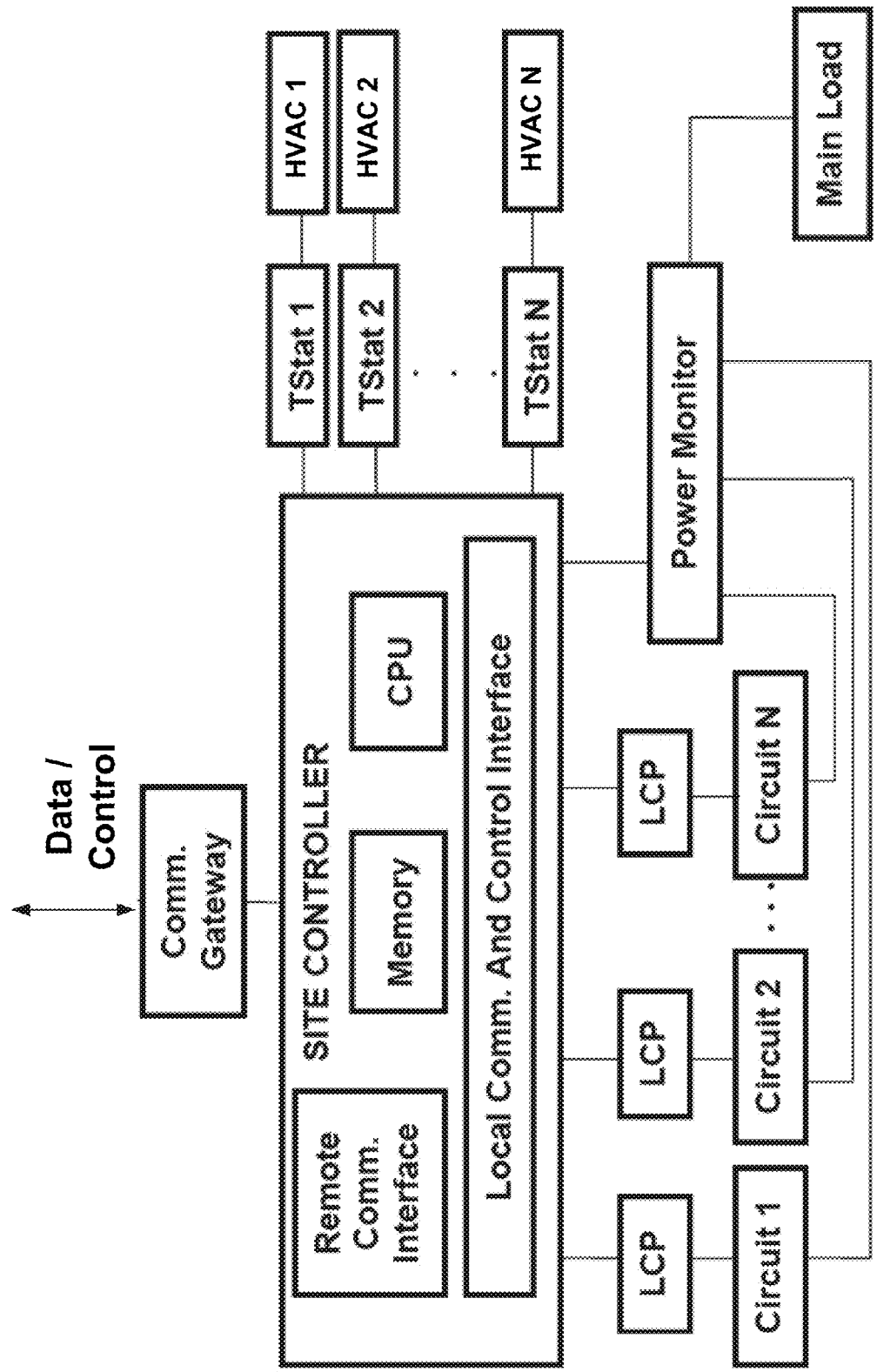
FIG. 1 shows a block diagram illustrating an energy management system.

The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed software package, and may reside in collocated or remotely located servers. Combinations of functional blocks in the block diagrams or operational illustrations herein may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. It should be understood that the various embodiments are not limited to the arrangements and instrumentalities shown in the drawings.

DETAILED DESCRIPTION OF THE INVENTION

The present invention may be understood more readily by reference to the following detailed description of preferred embodiments of the invention as well as to the examples included therein. Embodiments of the invention provide systems and methods for providing local override control of an EMS. The following description and drawings are illustrative and are not to be construed as limiting. Numerous specific details are described to provide a thorough understanding. However, in certain instances, well-known or conventional details are not described in order to avoid obscuring the description. Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In an embodiment, each physical site has installed in it monitoring and control hardware that is part of the energy management system and separate from the utility installed electric meter. The monitoring equipment measures real-time main load current and voltage. Preferably, the monitoring equipment also measures the current and voltage of sub-loads (a.k.a., "endpoints") at the customer site and sends that data to the energy management system software to be stored and processed. The control equipment responds to commands from the energy management system software to regulate selected sub-loads as needed.

The customer can access the energy management system software remotely using a third party provider or directly in cases where the software is installed at the user-operated control center. The user can also send control signals to the energy management system to affect energy usage at one or more of its sites and can receive monitoring data describing usage at one or more of its sites. Using the energy management software, the user can also control sub-loads according to specific schedules at each site to optimize energy usage and minimize energy costs by enabling any number of load control algorithms or reacting to energy event alerts raised by the energy management system. Examples of such control algorithms are described in detail in U.S. patent application Ser. No. 13/495,720, entitled "Controlling The Setback And Setback Recover Of A Power-Consuming Device" and U.S. patent application Ser. No. 13/425,195, entitled "Dynamic Load Curtailment System And Method," both incorporated herein in their entirety.

On-Site Controller

FIG. 1 is a schematic block diagram illustrating an embodiment of typical energy management system hardware installed at a customer site. A site controller with embedded control algorithms controls multiple electrical loads on circuits 1 through N via light control panels (LCPs). The site controller is typically wired to common voltages at an electrical distribution panel of a commercial or residential building facility via a main line meter (power monitor). The site controller includes memory and a CPU for respectively storing and implementing energy management algorithms. The algorithms accept real-time power and environmental variable measurements (including readings from thermostats TStat 1 through TStat N) as inputs and determine how to control the power delivered on the circuits 1 through N and to control set points and other configurable settings such as enabling/disabling compressor stages on TStat 1 through TStat N. The site controller may include a power supply and one or more wired or wireless local communication and control interfaces for controlling Circuit 1 through Circuit N and TStat 1 through TStat N. Thermostats TStat 1 through TStat N provide temperature and humidity inputs to the site controller, and output control signals to roof-top units RTU 1 through RTU N. A communication interface provides bi-directional communication with a communication gateway, which in turn manages wired or wireless communications with a server or remote terminal. All communications between the site controller and the thermostats, and between thermostats, may be direct communications or may be indirect communications, e.g., communications that are effectively transmitted to their destination via a gateway, hub, intermediary controller or the like.

One or more power monitors are coupled to the site controller either via wired or wireless connection. The power monitor includes hardware and firmware to provide sampling functionality, including multiple analog-to-digital converters for multi-channel fast waveform sampling of inputs such as current and voltage. The power monitor includes wired or wireless communication interfaces, current and voltage monitoring interfaces, memory, CPU, and may also include a power supply.

The current and voltage monitoring interfaces connect between the power circuits being monitored and the A/D converter. Each channel may be connected to a separate power circuit to monitor the flow of current through the circuit. The connection is typically made with a current transformer at both a supply (i.e., hot) line and a return (i.e., neutral) line of the power circuit, which provides a waveform signal that is representative of the current flow at the connection point.

Remote Terminal Unit

Figure 2:
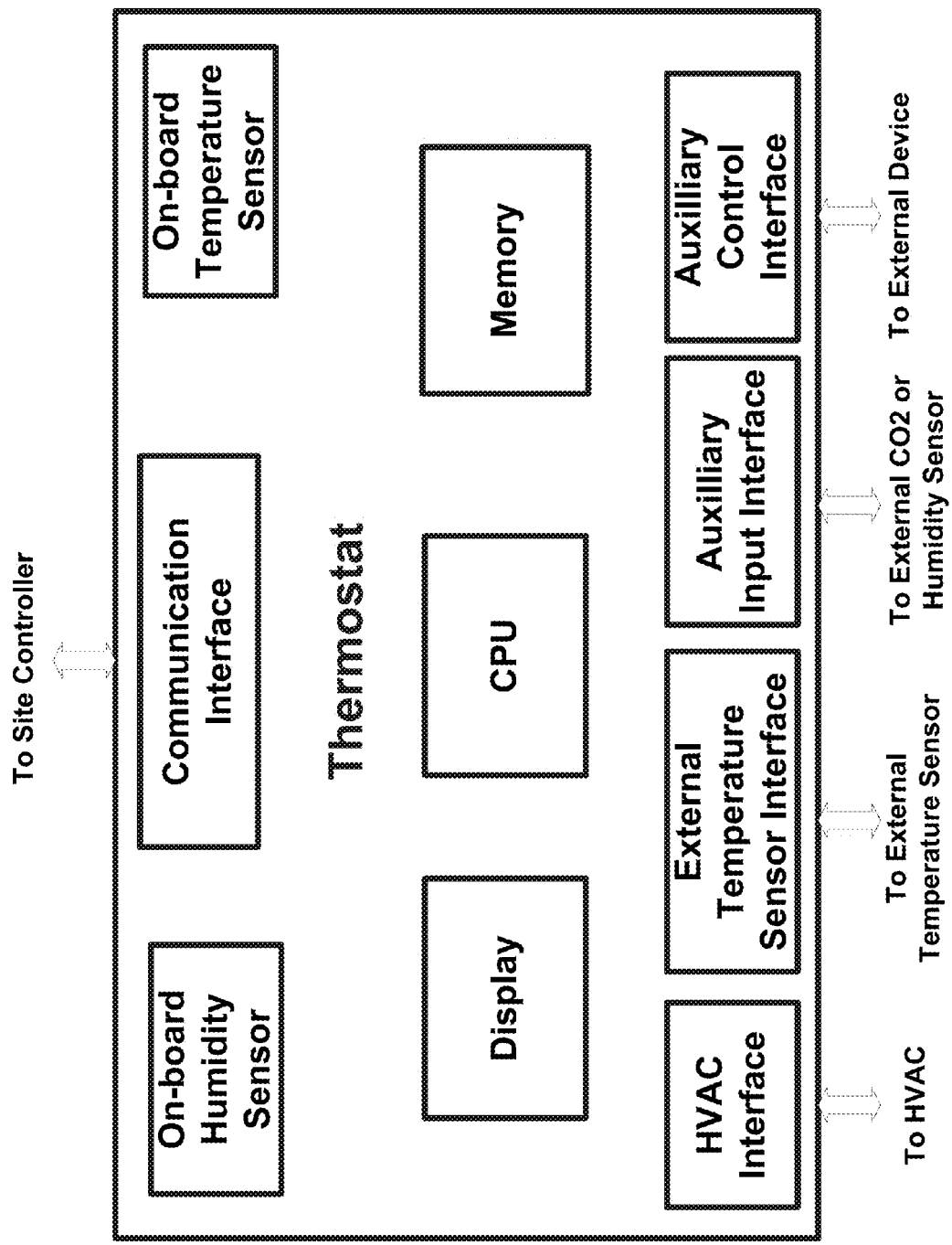
FIG. 2 shows a block diagram illustrating a thermostat with a remote terminal mode.

FIG. 2 shows an embodiment of a remote terminal unit (RTU), in this case a thermostat that could serve the functions of one or more thermostats TStat 1 through TStat N. The RTU includes a touch screen display, a memory for storing set points and screen menus, and a CPU for processing input commands, controlling HVAC units, and enabling communications. The RTU can be equipped with an on-board temperature sensor for determining whether a particular heating and cooling zone is within applicable set points. In this embodiment, it is also equipped with an external temperature sensor interface for receiving temperature measurements taken at some location beyond the thermostat. The thermostat also includes a wired and/or wireless communication interface for communication with the site controller. An HVAC interface includes relays that enable the CPU to control one or more HVAC units and input interface for receiving status from HVAC units. An auxiliary control interface is also included to provide control to miscellaneous devices.

System Operation

In operation, the RTU receives fixed heating and cooling set points from the site controller that remain static until updated again by the site controller or temporarily overridden locally using the RTU touch screen. In an embodiment, the RTU is not configured to allow for the programming of temperature set point schedules of itself or any other of the other thermostat. Likewise, the RTU is not configured to allow for programming of lighting schedules, although it does permit a lighting schedule to be temporarily overridden using the touch screen.

In accordance with this embodiment, all temperature set point and lighting schedule control algorithms are performed in the site controller. In this way, the touch screen display of any RTU can act as an interface to the site controller and thus provides all of the necessary local controller functionality at the location of any thermostat associated with the same controller. This configuration reduces system complexity by maintaining all of the schedule and control algorithms within the site controller, while permitting override and status control to any location having a remote terminal enabled thermostat. It also allows the site controller to be installed at a wider variety of locations because physical access to the site controller will be less frequent. Because it does not need its own touch screen display, the site controller is simplified and its cost lowered.

In operation, according to an embodiment, the remote terminal thermostat displays the following data collected by the site controller on control points, including data from the thermostat itself: (1) zone/control temperature, (2) HVAC status (idle/cool/heat/unknown), (3) lighting groups, (4) name/identifier, and (5) status (on/off/pending). The RTU requests set point changes and lighting overrides (change requests) as well as a system shutdown (e.g., all lights off and thermostats placed in unoccupied mode). While the site controller performs all logic and control, the remote terminal thermostat in this embodiment does no more than display data that is provided by the site controller, and send change requests from the user to the site controller. Remote terminal thermostat functionality can be enabled or disabled by the site controller in runtime. When an operator is setting up the configuration of the site controller, the operator designates which thermostat will have the remote terminal unit feature enabled based on site operation. On the control network, the site controller designates a number of remote terminal thermostats, and then chooses a maximum number of thermostats and lighting groups to be displayed on the designated RTUs.

Figure 3:
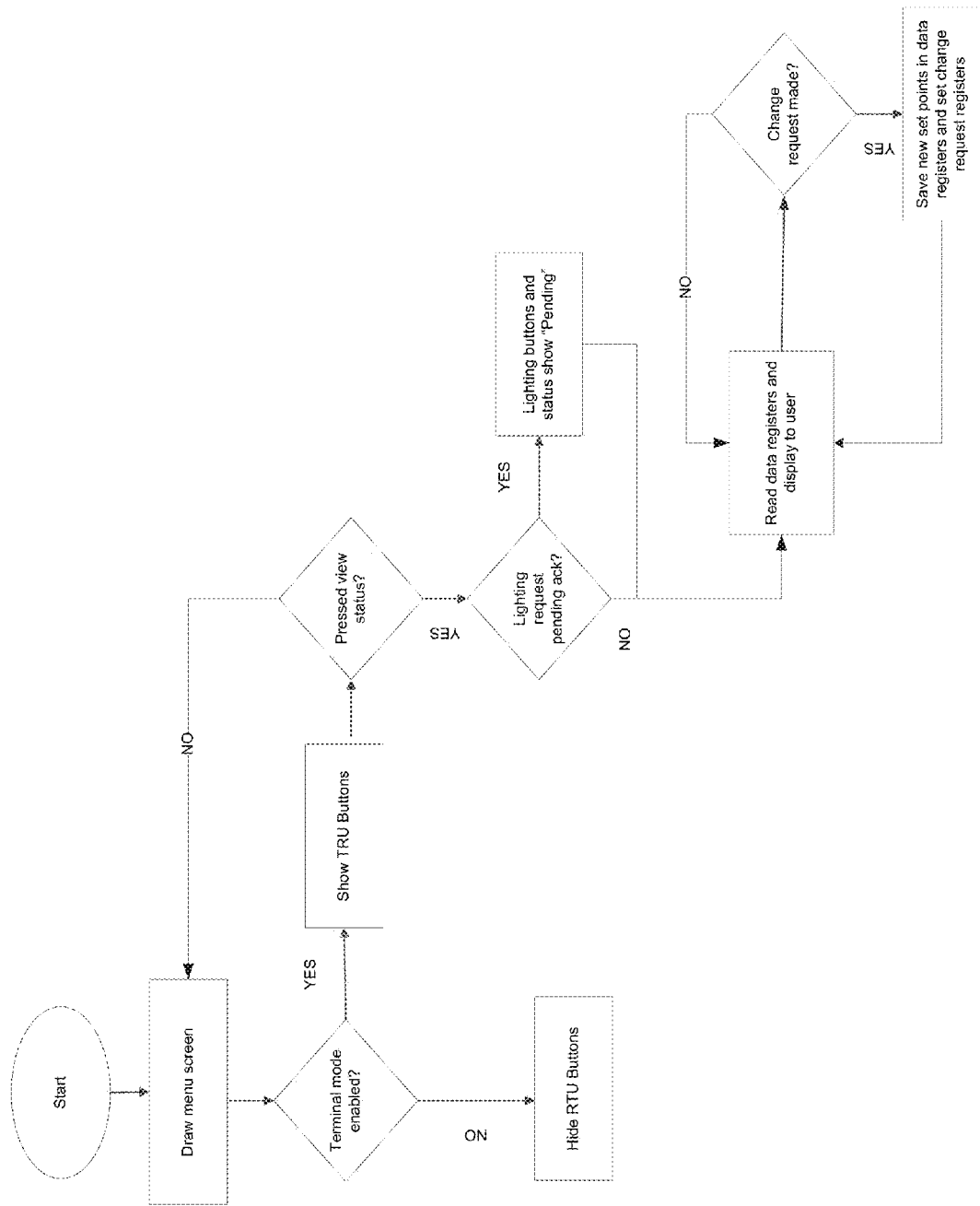
FIG. 3 shows a flow diagram illustrating a change request cycle of the remote terminal thermostat.

In operation, in accordance with one embodiment, the RTU draws a menu screen and a check is performed to determine whether the site controller has enabled the RTU to operate in terminal mode. The zone set point information is hidden or shown according to permissions previously issued to the RTU by the site controller. If the user pushes the lighting button, the lighting data for all lighting groups is displayed. In cases where a previous lighting request has been made, and no acknowledgement from the site controller has been received, the status of the lighting settings can be displayed as "pending." If a user requests a lighting change by toggling on or off the button on the menu, the changes are saved in a register and a new change request is sent to the site controller for processing. FIG. 3 is an illustration of a flow chart depicting Data Display Sequence and Change Request Capture on the RTU.

Figure 4:
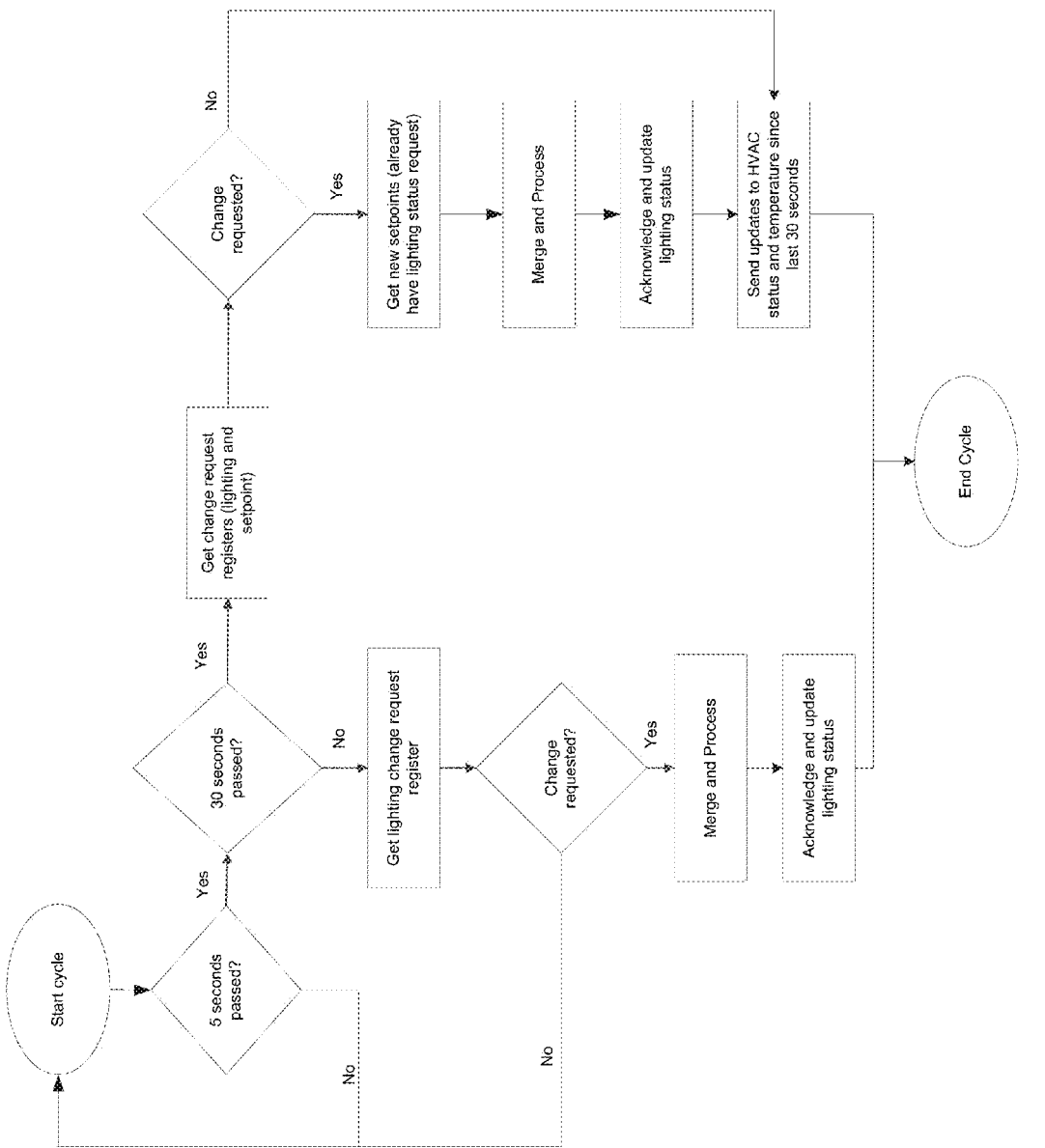
FIG. 4 shows a flow diagram illustrating a data display and change request capture of the remote terminal thermostat.
Figure 5A:
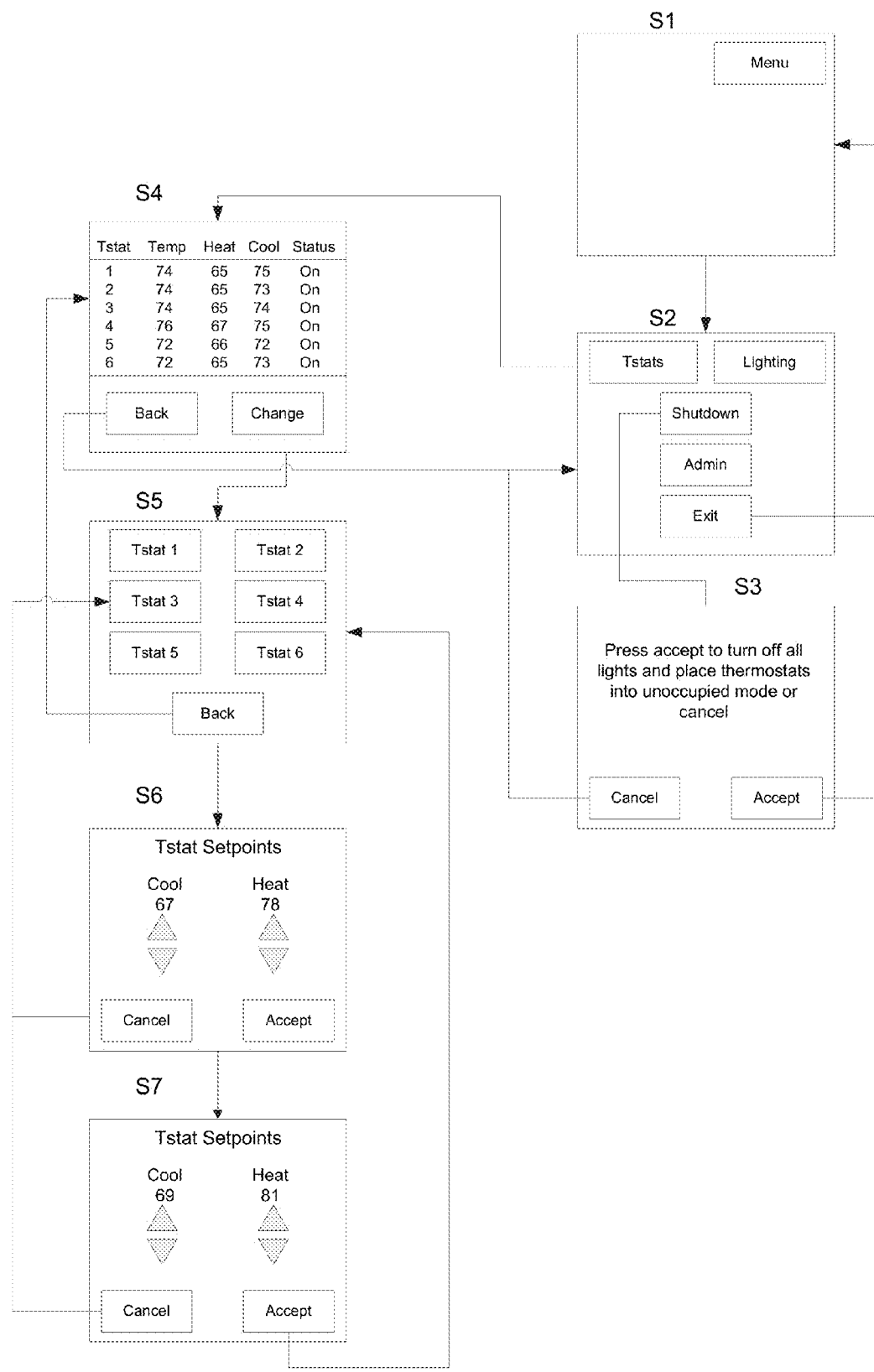
FIG. 5a shows a block diagram illustrating an RTU screen flow for reviewing and overriding temperature set points.
Figure 5B:
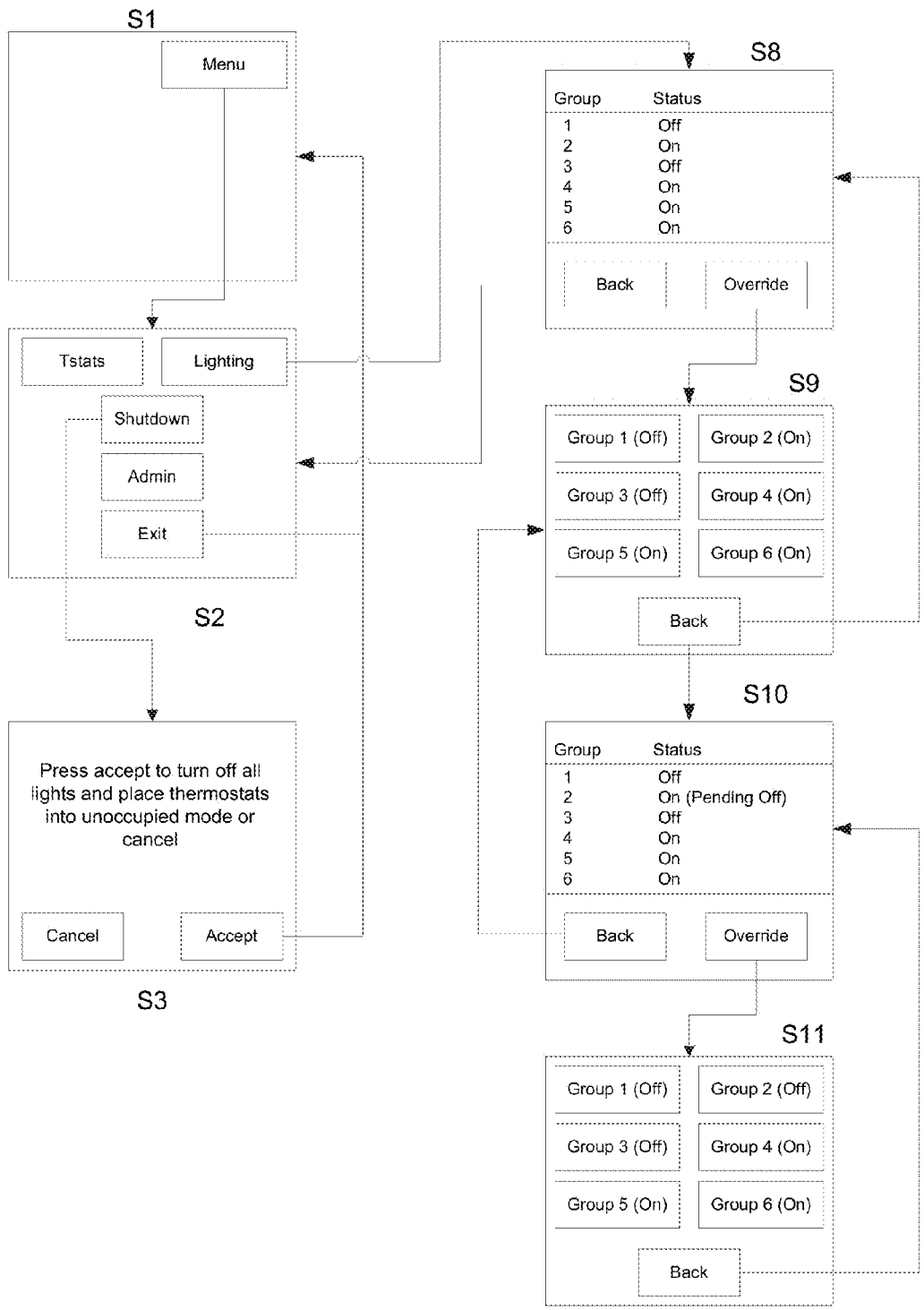
FIG. 5b shows a block diagram illustrating an RTU screen flow for reviewing and overriding lighting group settings.

In an embodiment, the Site Controller monitors each RTU for lighting change requests and system shutdown requests every 5 seconds, and set point change requests every 30 seconds. The site controller can have a global value for the maximum/minimum change that a user can make to a set point, and any requests that violate the maximum/minimum are clipped at the maximum/minimum. Dead bands for set points are conserved by the thermostat. As a result, the EMS should only observe maximum change to the set points and then update the respective thermostat set point accordingly in which the set point override has been requested. A system shutdown is indicated when the RTU requests that all lights are to be overridden "Off". The site controller should then put the thermostats into unoccupied mode. If a lighting group is overridden "On", the site controller should keep the group "On" until a timeout. If a lighting group is overridden "Off", the site controller should keep "Off" until the next scheduled time the lights are to be switched to "On". Lighting overrides that are not allowed due to control algorithms on the site controller should be flagged as "Override Denied" in a status register at the time an acknowledge is sent to the RTU. If a change request is discovered during a 5/30 second poll, the site controller will then merge and process change requests from all RTUs, send an acknowledge by clearing change request register, and send updates to all RTU's with permissions. In an embodiment, during this merge process, the site controller evaluates all the override requests and if multiple requests are received to override a common thermostat's set points, the maximum set point is used and sent to the respective thermostat. FIG. 4 is an illustration of a flow chart depicting a change request cycle in the site controller RTU Screen Flow FIGS. 5a and 5b are illustrations of flow charts depicting a screen flow of screens S1-S11 of an RTU. As shown in FIG. 5a, when the "Menu" button is pressed on Screen1, the system displays Screen S2, which includes a number of choices to the user, including "Tstats," "Lighting," and "Shutdown."

When the "Tstats" button is pressed, the user is shown Screen S4, which provides a list of thermostats associated with the site controller, along with the current temperature, heating and cooling set points, and current status. The user can also select "Change" to display Screen S5, which allows modification of one or more of the set points.

Screen S5 displays the various heating and cooling zones, and allows the user to select which zone to modify by pressing one of the "Tstats" buttons, causing Screen S6 to appear.

Screen S6 includes an up/down button for modifying the heating and cooling set points for the selected zone. If the user does not want to make a change, "Cancel" is pressed and S5 is displayed. If the user wishes to change a set point, the user presses the up/down button for either or both of heat or cool. As shown in Screen 7, upon adjustment of the heating and cooling set points, the use presses "Accept" to save the new set points and to send a request message to the site controller over a wireless or hardwired network to make the change. The user can back out of the nested menu at any time by using "Back" or "Cancel" buttons.

As shown in FIG. 5b, when the "Lighting" button in Screen S2 is pressed, the user is shown Screen S8, which provides a list of lighting groups and a choice to "Override" or to step back to the previous menu. Upon selection of "Override", the user is presented with Screen S9, which provides a list of lighting group buttons from which the user can select, and a status of each lighting group. Upon selection of a lighting group, the status of the lighting group is toggled on/off depending on the previous state, and Screen S10 is displayed.

Screen S10 provides a list of lighting groups and identifies the intended override by the user as well as a final override button. If the "Override" button is pressed on Screen S10, Screen S11 is displayed showing the new state of the lighting groups.

The Menu Screen S2 also has a "Shutdown" button, which causes Screen S3 to display. Screen S3 provides the user a final "Accept" or "Cancel" of the user's intention to turn off all lights and place thermostats into the unoccupied state.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A method of controlling an energy management system having a plurality of zones respectively controlled by a plurality of thermostats, the method comprising:
    receiving, via a touch screen of a first thermostat, a command to display set points of one or more zones of a building, the first thermostat being one of the plurality of thermostats, each controlling one or more zones of a building;
    causing the touch screen of the first thermostat to display the set points of the one or more zones;
    receiving, via the touch screen of the first thermostat, an override command and override set points for a selected zone of the one or more zones to temporarily alter the set points of the selected zone;
    transmitting the received override set points to a central site controller for processing;
    determining, at the central site controller, whether the override set points are within preset allowable parameters;
    merging, if the override set points are within preset allowable parameters, the override set points with currently programmed set points for at least one of said plurality of thermostats;
    sending the override set points to a second thermostat controlling a zone associated with the override set points for storage in the second thermostat memory;
    controlling, with the second thermostat, the temperature of a zone associated with the second thermostat according to the override set points;
    determining whether a predetermined amount of time has elapsed since the override set points were sent to the second thermostat, and if so, sending the currently programmed set points to the second thermostat; and
    controlling, with the second thermostat, the temperature of the zone associated with the override set points according to the currently programmed set points;
    generating and sending, via the site controller, an override request deny signal if the requested override set points are not within preset allowable parameters;
    receiving, via the first thermostat, the override request deny signal from the site controller; and displaying, on the touch screen a symbol representative of the override request deny signal;
    wherein said steps of receiving a command to display set points, causing the touch screen to display the set points, receiving an override command and override set points, transmitting the received override set points, determining whether the override set points are within allowable parameters, merging override set points, sending the override set points, controlling the temperature, and determining whether an amount of time has elapsed are conducted by one or more particular machines comprising one or more processors and memory, respectively.

2. The method of controlling an energy management system according to claim 1, where the first and second thermostats are the same thermostat.

3. The method of controlling an energy management system according to claim 1, where the first and second thermostats are not the same thermostat.

4. The method of controlling an energy management system according to claim 1, wherein the currently programmed set points are set points from the current set point schedule.

5. The method of controlling an energy management system according to claim 1, wherein the currently programmed set points are set points determined by one or more control algorithms running on the site controller.

6. The method of controlling an energy management system according to claim 1, further comprising the steps of: sending permissions to one or more of the plurality of individual thermostats indicating whether the thermostat is to operate in remote terminal mode; and designating which zone information the one or more thermostats can display.

7. The method of controlling an energy management system according to claim 6, further comprising the step of designating which zones the thermostat can control.

8. The method of controlling an energy management system according to claim 1, further comprising the steps of: receiving, via the touchscreen display of the first thermostat, a shutdown command; and sending a shutdown command signal to the site controller indicating to the site controller a request to put the energy management system into an unoccupied mode.

9. The method of controlling an energy management system according to claim 1, further comprising the steps of:
    receiving, via the touch screen of the first thermostat, a command to display lighting settings of one or more lighting groups;
    displaying, via the touch screen of the first thermostat, the settings of the one or more lighting groups;
    receiving, via the touch screen of the first thermostat, a lighting group override command and lighting group override setting for a selected lighting group of the one or more lighting groups to temporarily alter the setting of the selected lighting group;
    transmitting the received lighting group override setting to the central site controller for processing;
    determining, at the central site controller, whether the lighting group override setting is allowed based on preset allowable lighting parameters;
    merging, if the override lighting group setting is allowed, the lighting group override settings with currently programmed settings;

sending the lighting group override settings to a second thermostat controlling the zone associated with the lighting group override settings for storage in the second thermostat memory;

controlling, with the site controller, the lighting group associated with the second thermostat according to the override lighting group setting; and determining whether a predetermined amount of time has elapsed since the override lighting group setting was implemented, and if so, controlling the lighting group according to the current programmed lighting group setting.

10. The method of controlling an energy management system according to claim 9, where the first and second thermostats are the same thermostat.

11. The method of controlling an energy management system according to claim 9, where the first and second thermostats are not the same thermostat.

12. The method of controlling an energy management system according to claim 1, wherein said transmitting step comprises wirelessly transmitting the received override set points to a central site controller.

13. The method of controlling an energy management system according to claim 1, wherein said transmitting step comprises transmitting the received override set points to a central site controller over a hardwired interface.

14. The method of controlling an energy management system according to claim 1, wherein said step of sending the override set points to the second thermostat comprises directly sending the override set points to said second thermostat.

15. The method of controlling an energy management system according to claim 1, wherein the site controller receives real-time power measurements from a power monitor and implements energy management algorithms.

16. The method of controlling an energy management system according to claim 15, wherein said real-time power measurements comprise current and voltage measurements on a plurality of circuits.

17. A computer program product for controlling an energy management system having a plurality of zones respectively controlled by a plurality of thermostats, comprising:

a non-transitory computer usable medium having computer readable program code embodied in the computer usable medium for causing an application program to execute on a computer system, the computer readable program code means comprising:

computer readable program code for receiving, via a touch screen of a first thermostat, a command to display set points of one or more zones of a building, the first thermostat being one of the plurality of thermostats, each controlling one or more zones of a building;

computer readable program code for causing the touch screen of the first thermostat to display the set points of the one or more zones;

computer readable program code for receiving, via the touch screen of the first thermostat, an override command and override set points for a selected zone of the one or more zones to temporarily alter the set points of the selected zone;

computer readable program code for transmitting the received override set points to a central site controller for processing;

computer readable program code for determining, at the central site controller, whether the override set points are within preset allowable parameters;

computer readable program code for merging, if the override set points are within preset allowable parameters, the override set points with currently programmed set points for at least one of said plurality of thermostats;

computer readable program code for sending the override set points to a second thermostat controlling a zone associated with the override set points for storage in the second thermostat memory;

computer readable program code for controlling, with the second thermostat, the temperature of a zone associated with the second thermostat according to the override set points;

computer readable program code for determining whether a predetermined amount of time has elapsed since the override set points were sent to the second thermostat, and if so, sending the currently programmed set points to the second thermostat; and computer readable program code for controlling, with the second thermostat, the temperature of the zone associated with the override set points according to the currently programmed set points;

computer readable program code for generating and sending, via the site controller, an override request deny signal if the requested override set points are not within preset allowable parameters;

computer readable program code for receiving, via the first thermostat, the override request deny signal from the site controller; and computer readable program code for displaying, on the touch screen a symbol representative of the override request deny signal.

18. An energy management system for controlling a plurality of zones respectively controlled by a plurality of thermostats, comprising:

a first thermostat configured to receive, via a touch screen, a command to display set points of one or more zones of a building, the first thermostat being one of the plurality of thermostats, each controlling one or more zones of a building, the first thermostat being further configured to cause its touch screen to display the set points of the one or more zones;

the first thermostat being further configured to receive, via the touch screen, an override command and override set points for a selected zone of the one or more zones to temporarily alter the set points of the selected zone;

the first thermostat being configured to transmit the received override set points to a central site controller for processing;

the central site controller comprising a processor and memory and being configured to determine whether the override set points are within preset allowable parameters, and being further configured to merge, if the override set points are within preset allowable parameters, the override set points with currently programmed set points for at least one of said plurality of thermostats;

the central site controller being configured to send the override set points to a second thermostat controlling a zone associated with the override set points for storage in the second thermostat memory;

the second thermostat being configured to control the temperature of a zone associated with the second thermostat according to the override set points;

the central site controller being configured to determine whether a predetermined amount of time has elapsed since the override set points were sent to the second thermostat, and if so, to send the currently programmed set points to the second thermostat; and the second thermostat being configured to control the temperature of the zone associated with the override set points according to the currently programmed set points; the system being configured to generate and send, via the site controller, an override request deny signal if the requested override set points are not within preset allowable parameters; the system being configured to receive, via the first thermostat, the override request deny signal from the site controller; and the system being configured to display, on the touch screen, a symbol representative of the override request deny signal.

\* \* \* \* \*